E. R. WESTON.

Burnishing Machines for Photographs.

No. 5,888. Reissued May 26, 1874.

Witness
W. E. Brown

W. S. Pearson.

Inventor
Emile R. Weston
Per Chas. Franklin Seavey, Atty.

AM. PHOTO-LITHOGRAPHIC CO. N. Y. (OSBORNE'S PROCESS.)

UNITED STATES PATENT OFFICE.

EMILE R. WESTON, OF BANGOR, MAINE, ASSIGNOR, BY MESNE ASSIGNMENTS, TO JOSEPH P. BASS, OF SAME PLACE.

IMPROVEMENT IN BURNISHING-MACHINES FOR PHOTOGRAPHS.

Specification forming part of Letters Patent No. 131,319, dated September 10, 1872; reissue No. 5,281, dated February 11, 1873; reissue No. 5,888, dated May 26, 1874; application filed April 3, 1874.

*To all whom it may concern:*

Be it known that I, EMILE R. WESTON, of Bangor, in the county of Penobscot and State of Maine, have invented a certain new and useful Improved Burnisher for Burnishing Photographs, Card-Board, and articles of a kindred nature; and I hereby declare the following to be a full, clear, and exact description thereof, which will enable others to make and use the same, reference being had to the accompanying drawing forming a part of this specification, in which—

Figure 2:
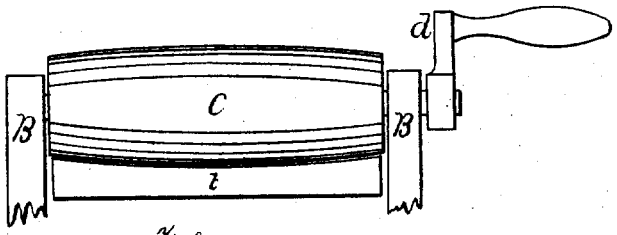
Figure 1:
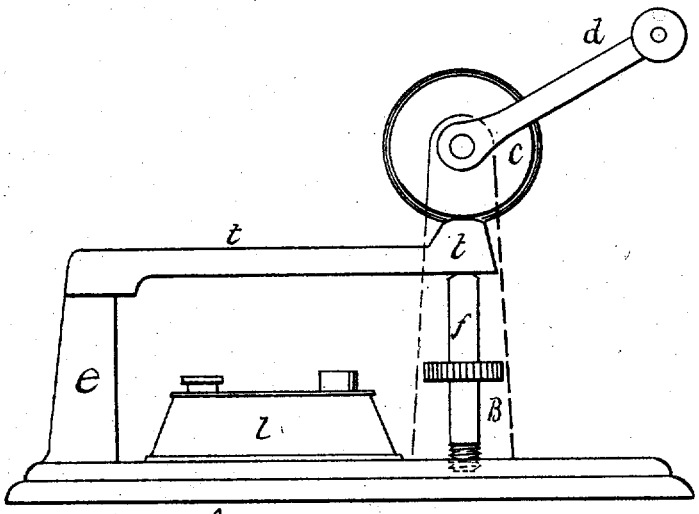

Figure 1 shows a side view; Fig. 2, a front view of roll and burnishing-tool.

Same letters show like parts.

My invention consists of a burnishing-machine for photographs and similar articles, in which the article to be polished receives its surface by being fed or moved over the surface of a non-rotating or stationary burnishing-tool.

My device effects its purpose by friction under pressure, and is adapted to polishing photographic pictures, card-board, and other articles of like nature which are capable of receiving a surface by continuous friction under pressure against the surface of a burnishing-tool. The cylindrical form of the roll gives but a small line of pressure upon the surface of the tool, which, being the more highly polished of the two, allows the article to be fed through, polishing it in its passage. The distance between the roll and tool is adjustable, regulating the amount of pressure on the article to be burnished. The application of heat to the tool materially adds to its effect.

The burnishing-tool is composed of metal, having a turned edge or projection under the feed-roll. I think cast-iron will be found preferable with the projection case hardened and highly polished.

In the drawing, A shows the base of the machine; B B, standards supporting the feed-roll C, and *d* a crank by which it may be rotated. At *c* is a standard for supporting the burnishing-tool, which consists of a plate supporting the polished tool at one end thereof under the feed-roll. At *f* is the device for adjusting the distance between the feed-roll and tool, consisting of a pressure-screw under the tool, thereby making the same adjustable to the roll. At *l* is a lamp for supplying heat to the tool.

I do not claim a press consisting of two rollers, between which the photograph is passed, nor do I claim two rollers in any form. My device is entirely different, and operates on a different principle, the feed-roll only rotating, and the burnishing-tool from which the article receives its surface being non-rotating or stationary.

What I claim as my invention, and desire to secure by Letters Patent, is—

1. A burnishing-machine by which a surface is given to the article to be burnished by feeding it under pressure over the surface of a burnishing-tool, substantially as specified.

2. The combination of a burnishing-tool and a friction feed-roll, substantially as specified.

3. The combination of the feed-roll and adjustable burnishing-tool, substantially as and for the purposes described.

In testimony that I claim the foregoing I have hereunto set my hand this 1st day of April, 1874.

Witnesses: E. R. WESTON.

WM. FRANKLIN SEAVEY,

J. P. BASS.